Nov. 21, 1950 W. A. HELSTEN 2,531,358
ROTOR TYPE RAILWAY BRAKE
Filed March 7, 1946 4 Sheets-Sheet 1
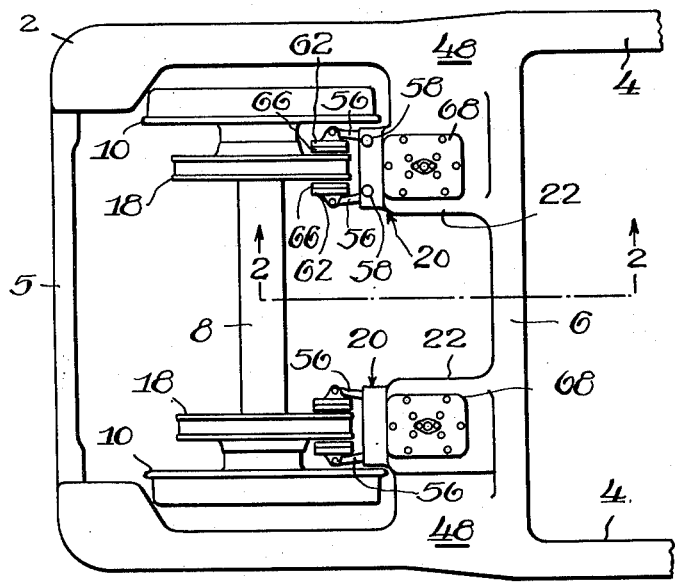
Fig.1
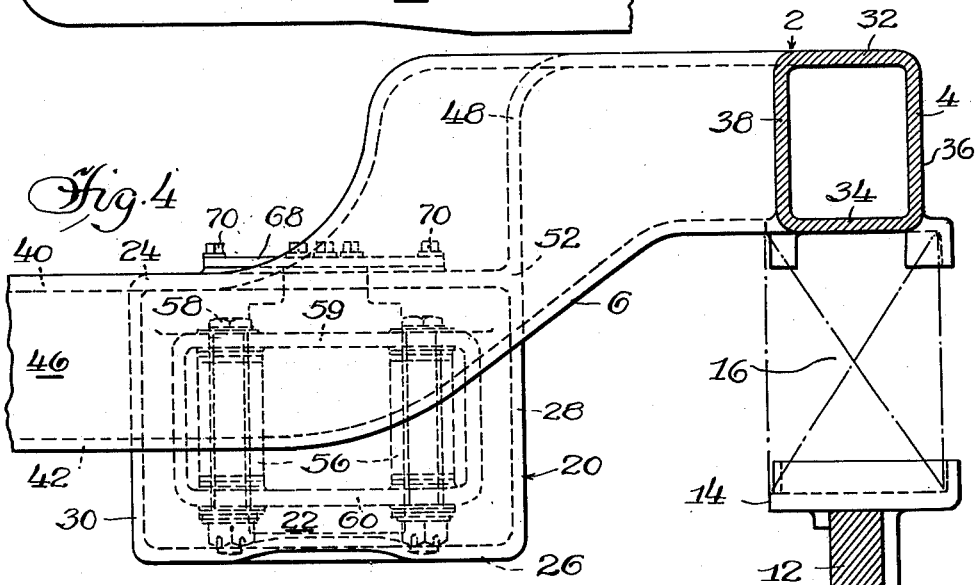
Fig.4
Fig.5
INVENTOR.
Wesley A. Helsten,
BY
Atty.

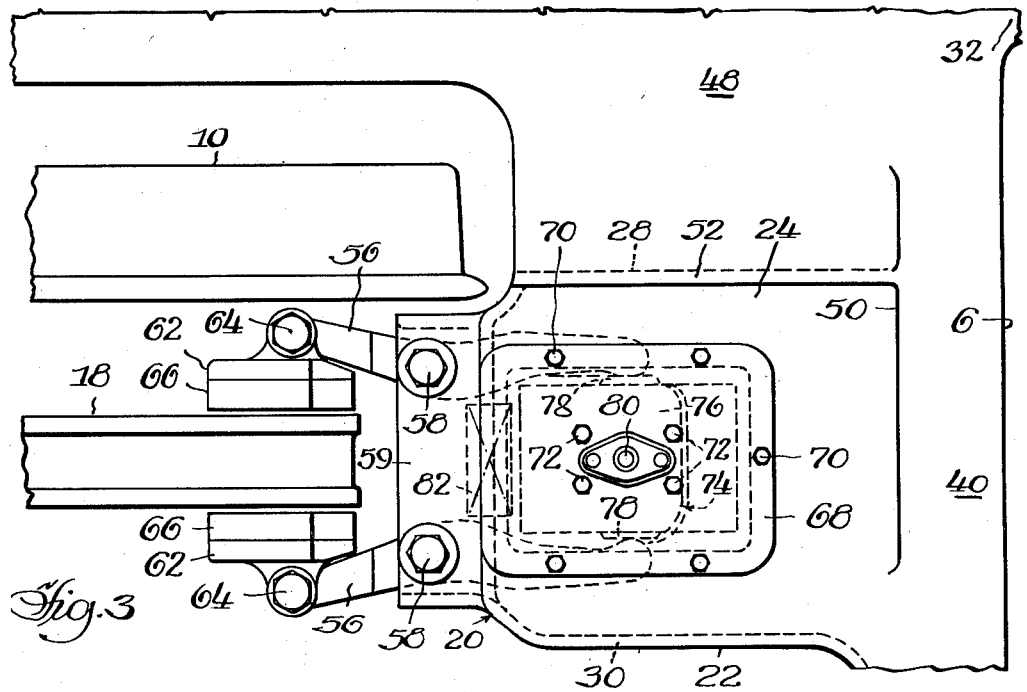
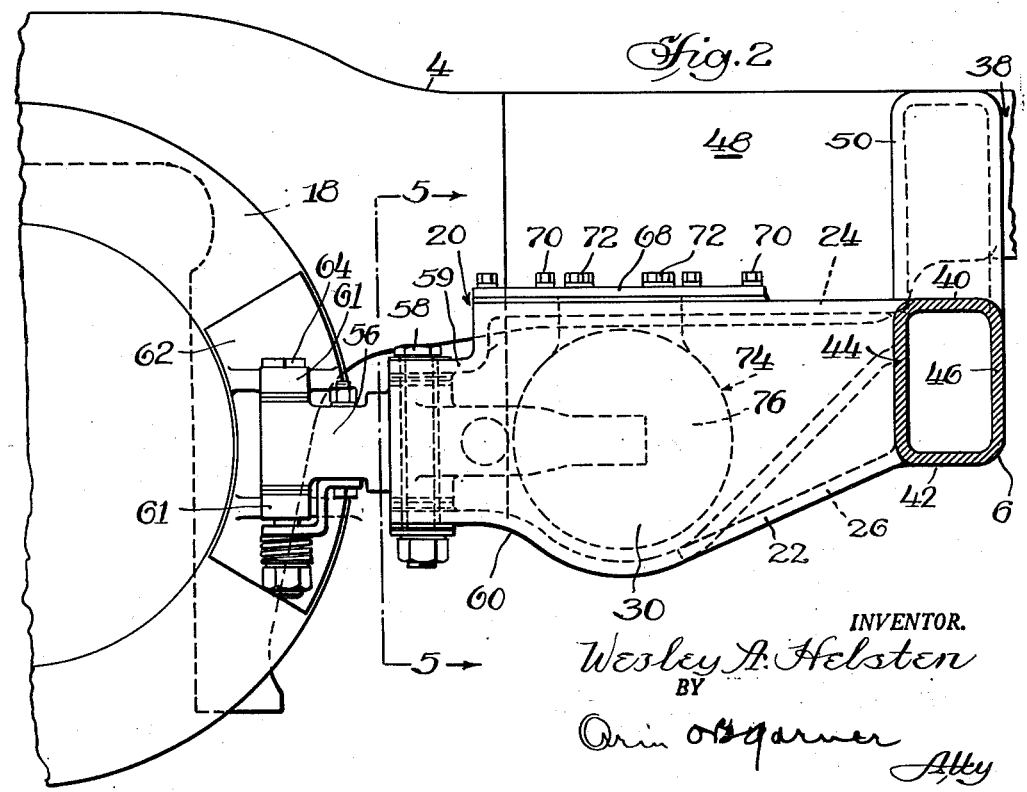

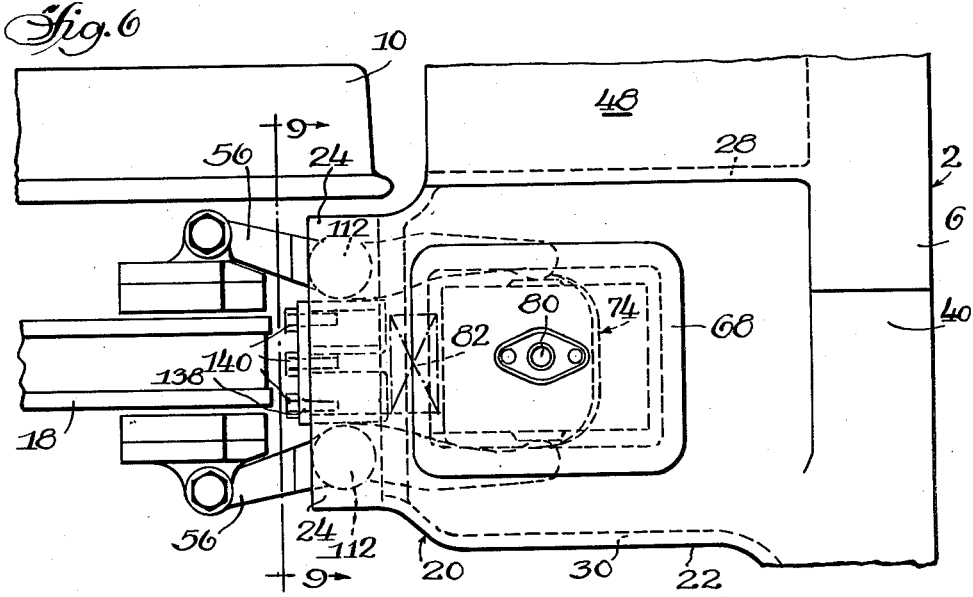
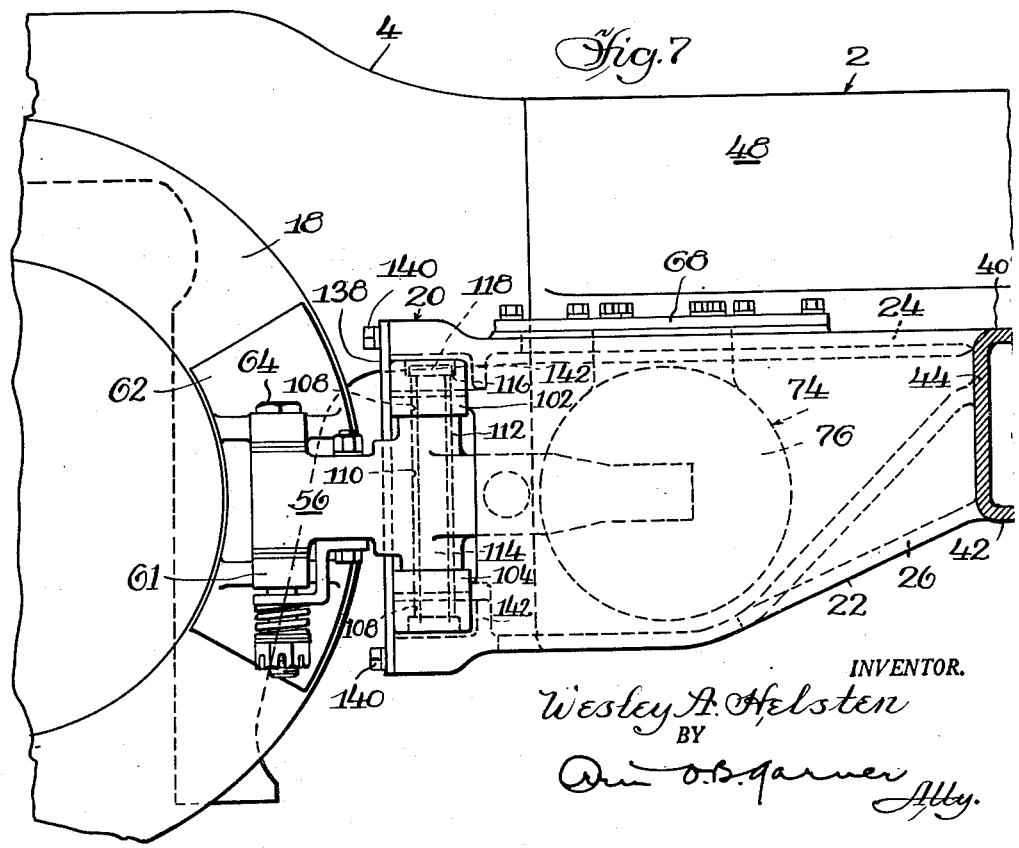

Nov. 21, 1950 W. A. HELSTEN 2,531,358
ROTOR TYPE RAILWAY BRAKE
Filed March 7, 1946 4 Sheets-Sheet 4

INVENTOR.
Wesley A. Helsten

Patented Nov. 21, 1950

2,531,358

UNITED STATES PATENT OFFICE 2,531,358

ROTOR TYPE RAILWAY BRAKE

Wesley A. Helsten, Chicago, Ill., assignor to American Steel Foundries, Chicago, Ill., a corporation of New Jersey Application March 7, 1946, Serial No. 652,646

16 Claims. (Cl. 188—59)

My invention relates to railway brake equipment and more particularly to a novel disc or rotor brake arrangement wherein braking means is provided for decelerating one or more brake discs or rotors associated with the wheel and axle assembly of a railway car truck.

Another object of my invention is to design a car truck having braking means comprising brake levers and a brake cylinder which are directly mounted on the truck frame, thereby dispensing with employment of brake frames or other separate mounting means conventionally connected to the truck frame or wheel and axle assembly and resulting in the increased weight of the truck and cost of manufacture of the brake equipment.

A further object of my invention is to design a car truck frame having an integral housing within which may be supported braking means associated with a brake disc, said housing being formed to accommodate assembly and disassembly of the braking means comprising power means within the housing for actuation of braking levers fulcrumed thereto and extending therefrom and supporting brake shoes for engagement with opposite sides of such disc.

My invention is illustrated as applicable to a four wheel truck in which the truck frame is normally spring-supported from an equalizing arrangement seated on the journal ends of the supporting wheel and axle assemblies. In such an arrangement the wheel and axle assemblies are mounted for movement laterally of the truck frame to avoid shocks to the truck frame and thence to the car body, as well understood in the art, and provision must therefore be made for permitting similar movement of the braking means supported by the truck frame to prevent transmission of the shock by the braking means to the truck frame during the braking operation in view of the relative movements of the wheel and axle assemblies and the truck frame.

It is a general object of my invention to provide novel means of affording movement of the braking means with the wheel and axle assemblies in the braking operation and during movement of the assemblies laterally of the truck frame.

My invention comprehends a novel truck frame comprising spaced side members and a transverse member extending therebetween and affording support for an associated bolster, said last-mentioned member being disposed at one side of the adjacent wheel and axle assembly and having a housing formed integrally therewith for supporting braking means for an adjacent brake disc associated with said assembly.

In the drawings:

Figure 1 is a top plan view of a railway car truck embodying my invention, only one end of the truck being shown inasmuch as the arrangement is the same at opposite ends;

Figure 2 is a side view of a portion of the truck shown in Figure 1, partly in section, the section being taken approximately in the longitudinal vertical plane bisecting the truck as indicated by the line 2—2 of Figure 1;

Figure 3 is a top plan view of the truck structure illustrated in Figure 2;

Figure 4 is a rear view of the structure illustrated in Figures 2 and 3;

Figure 5 is a view taken in the vertical plane indicated by the line 5—5 of Figure 2 with the brake levers shown in section;

Figures 6 to 9 are views similar to Figures 2 to 5, respectively, illustrating a modification of my invention.

Figure 8:
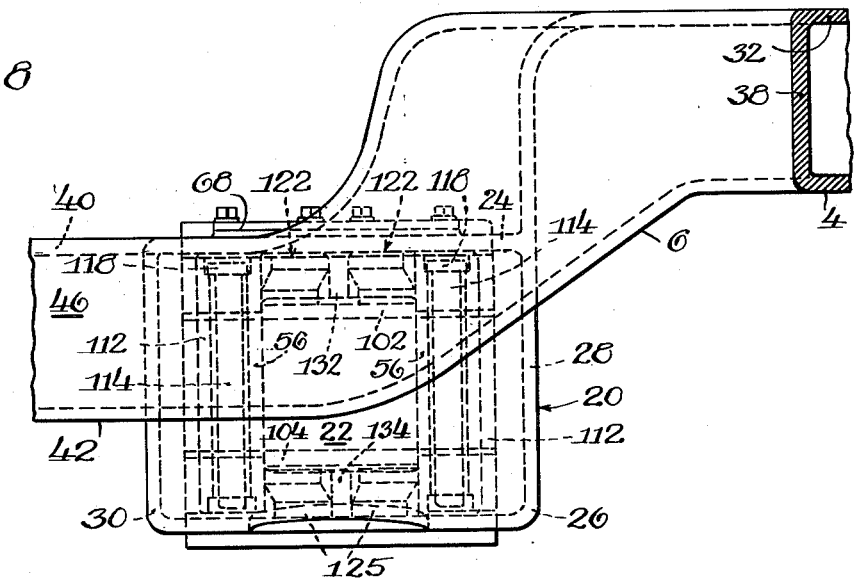

In each of said views certain details may be omitted where they are more clearly shown in other views.

Describing the structure in detail and referring first to the general arrangement illustrated in Figures 1 and 4, the car truck may comprise a truck frame, generally designated 2, having spaced side rails, 4, 4, and at each side of the transverse center line of the truck an end rail 5 and a transom 6, said end rail 5 and transom 6 being of box section and extending between and merging with said side rails 4, 4, said transoms affording support for a truck bolster (not shown).

The truck frame is supported at each end thereof by a wheel and axle assembly 8 comprising wheels 10, 10. Journal boxes (not shown) are mounted on the ends of the assembly 8 and an equalizer 12 of usual form is mounted in usual manner on the journal boxes at each side of the truck. A spring seat 14 is positioned on the equalizer adjacent each end thereof and supports a spring group diagrammatically indicated at 16 (Figure 4) which, in turn, supports the truck frame in conventional manner as shown. On each wheel and axle assembly may be mounted a brake disc 18 adjacent each wheel thereof, and braking means generally designated 20 may be provided on the truck transom adjacent each disc 18 for support of brake shoes in engagement therewith as more particularly described hereafter.

Referring now more particularly to Figures 2 to 5, I have shown one corner of the truck to illustrate my invention inasmuch as the formation and structure of the truck frame for supporting the braking means 20 adjacent each disc and the braking means associated therewith are substantially identical with that adjacent the other discs. In the preferred embodiment of my invention, the truck frame transom 6 has integrally formed therewith a housing or pocket 22 comprising a boxlike structure having spaced top and bottom walls 24 and 26 and side walls 28 and 30. As previously described, the transom 6 and each side rail 4, 4 are of conventional box section, as shown in Figures 2 and 4, with the transom offset upwardly adjacent its juncture with the side rail in conventional manner, said side rail comprising top and bottom walls 32 and 34 and side walls 36 and 38 and said transom comprising top and bottom walls 40 and 42 and side walls 44 and 46. Extending laterally of the side rail top wall 32 and forming a continuation thereof is a gusset 48 merging with the side wall 44 of the transom as at 50 and the side wall 28 of the housing as at 52. The top and bottom walls of the housing extend laterally from the side wall 44 of the transom and are formed as a continuation of the top and bottom walls 40 and 42 of the transom, respectively, as clearly seen in Figure 2, said side wall 44 thus forming the rear wall of said housing.

It will be apparent that the housing or pocket 22 is thus formed as an integral portion of the transom with the gusset 48 extending between and integrally uniting the side rail 4, transom 6, and housing 22, whereby a strong rigid unitary structure is provided for mounting and supporting the braking means adjacent each disc as will be described hereinafter.

The braking means 20 mounted in each housing 22 comprise a pair of brake levers 56, 56 fulcrumed intermediate the ends thereof within the housing 22 by means of pivot pins 58, 58 extending through respective levers and through parallel offset portions 59 and 60 of the respective top and bottom walls 24 and 26 at corresponding ends thereof, each lever extending outwardly of the housing and between spaced lugs 61, 61 on the associated brake head 62 for pivotal connection thereto by a pin 64 extending through aligned openings in said lugs 61, 61 and the adjacent end of the lever, each brake head 62 carrying a friction shoe 66 for engagement with the adjacent brake disc 18.

A cover plate 68 is removably connected as by bolts 70, 70 to the top wall 24 of the housing 22, said cover plate being bolted as at 72 to a cartridge cylinder unit 74 disposed within the housing, said unit comprising a cylinder 76 with spaced pistons 78, 78 therein engageable with the arcuate inner extremities of the brake levers 56, 56, said cylinder 76 comprising a nozzle 80 projecting through a complementary opening in the cover plate 68 to afford convenient connection as a source of actuating fluid, a tension release spring 82 (Figures 3 and 5) is connected at opposite ends thereof to the levers 56, 56 adjacent their inner ends for moving said levers to their release position subsequent to a braking operation.

It will be clearly apparent that the cartridge cylinder unit 74 may be slidably disengaged from the levers 56, 56 by disconnecting the cover plate 68 from the housing 22 and then lifting the unit from the housing, thereby affording an arrangement permitting the ready disassembly of the cartridge cylinder unit 74 from the housing for the purposes of cleaning and repair or replacement of the cylinder 76 and pistons 78, 78 without dismantling the brake levers 56, 56 from the housing. The cartridge cylinder unit 74 is per se no part of the present invention and is therefore not illustrated in detail herein, said unit being fully described and shown in United States Letters Patent No. 2,355,120, issued August 8, 1944, to Carl E. Tack.

Thus it will be understood that the novel brake arrangement above described comprehends the formation of housings integral with the truck frame for the reception and mounting of independent braking means for each disc associated with the wheel and axle assemblies, an arrangement dispensing with the use of brake frames or other means for mounting the brake means on the truck and thereby effecting substantial savings in the cost of manufacture of the brake equipment as well as a reduction in the weight of the truck.

Referring now to the modification of the invention illustrated in Figures 6 to 9, the truck assembly, including the formation of the truck frame to afford housings for the braking means for the respective brake discs, is substantially identical with that previously described and therefore similar reference characters have been utilized for designating the truck frame, the brake means associated therewith, and the wheel and axle assembly. The present arrangement differs from that disclosed in Figures 1 to 5 in that the brake levers are mounted within the housings for movement with the associated brake disc during movement of the wheel and axle assembly transversely of the truck, each housing being slightly modified for this purpose, as hereinafter described.

Figure 9:
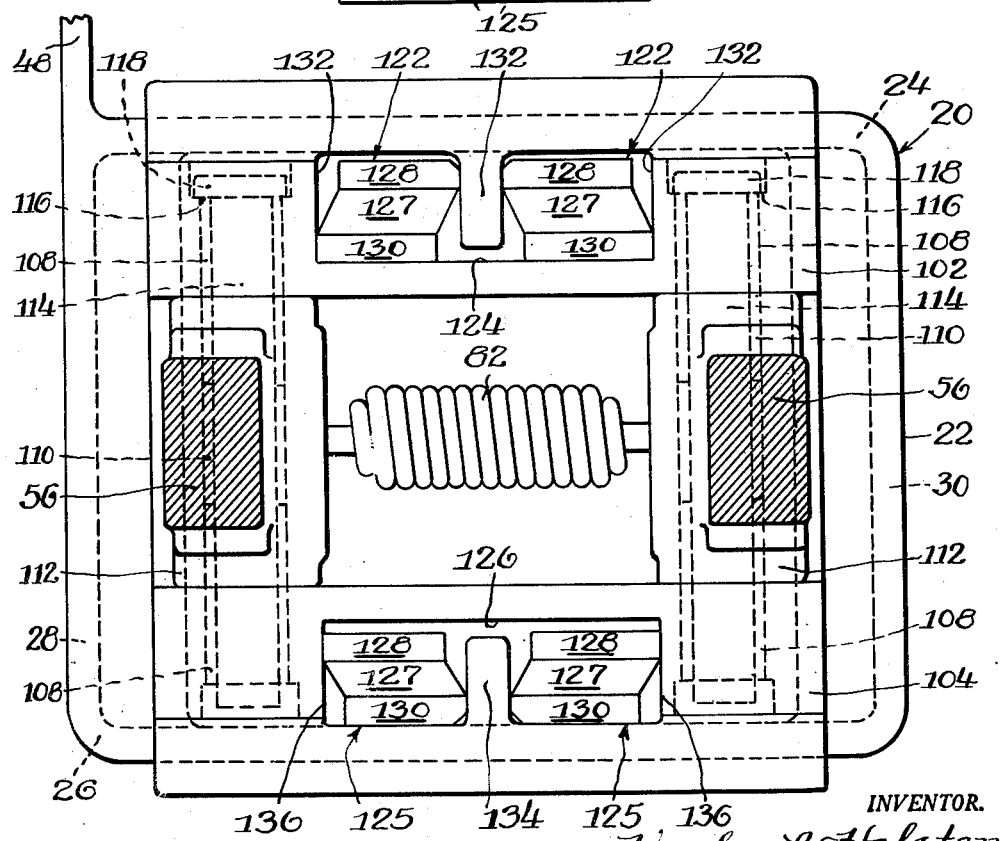

In a railway car truck such as described, it is desirable that the wheel and axle assemblies, supporting the car truck and body, have a limited amount of movement relative to the truck transversely thereof to allow the assemblies to follow track irregularities without lateral shocks being transmitted to the car truck and thence to the car body. During the braking operation and in the event track irregularities are simultaneously encountered, the rotors of the wheel and axle assemblies will transmit lateral movement of the assemblies to the brake levers mounted on the truck frame which will transmit lateral shocks to the truck frame and car body. To obviate this undesirable feature, and as best seen in Figure 9, the brake levers 56, 56 in the present arrangement are supported within the associated housing 22 between vertically aligned top and bottom blocks 102 and 104 slidably seated on the top and bottom walls 24 and 26, respectively, of the housing for movement with the levers transversely of the housing, each of said blocks having a vertical opening 108 at each end thereof in alignment with an opening 110 in the bearing portion 112 of the adjacent lever, a pin 114 extending through said openings and pivotally connecting said lever to the blocks. It may be noted that each opening 108 in the upper block is of enlarged diameter at its upper end to provide a shoulder 116 on which is seated the head 118 of the associated pin 114 in spaced relation to the top wall 24 of the housing and that the lower end of the pin is received within the lower enlarged portion of the opening 108 of the block 104. It will be apparent that the assembly described will move transversely of the housing during the braking operation in response to any lateral movement of the wheel and axle assembly transmitted by the rotor associated therewith to the brake levers.

Each lever is normally maintained substantially equidistantly spaced from the longitudinal center line of the housing by resilient units 122, 122 received within an elongated opening 124 of the block 102 and other resilient units 125, 125 seated within a similar opening 126 of the block 104, each of said blocks being identical and comprising a resilient pad 127 of rhomboidal form received between and vulcanized to metal plates 128 and 130, said units 122, 122 being seated on the block 102 and being disposed on opposite sides of the lug 132 on the top wall 24 of the housing with the plates 128, 128 thereof abutting said lug and each plate 130, 130 bearing against the adjacent vertical edge 132 of said block, partially defining the opening therein, and said units 125, 125 being seated on the bottom wall of said housing and receiving therebetween a lug 134 with the plates 130, 130 of said units having abutment with said lug and the plates 128, 128 of said units bearing against the adjacent vertical edge 136 of the block, partially defining the opening therein. It will be apparent that during the braking operation the levers and blocks will be moved by the associated disc upon the occurrence of lateral movement of the wheel and axle assembly in opposite directions, whereby the resilient units 122, 122 and 125, 125 will be placed in shear and prevent transmission of shock to the truck frame and, after cessation of the braking operation, will act to return the levers and blocks to their normal position within the housing.

To prevent movement of the assembly described longitudinally of the housing, a cover plate 138 extends between the levers and is secured by means of bolts 140, 140 to the top and bottom walls 24 and 26 of the housing, and also, each of said walls is formed with a transverse rib 142 for abutment with the rear surface of the adjacent block 102 or 104.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement for a railway truck comprising spaced wheel and axle assemblies and a unitary truck frame supported from said assemblies and including side members and a transversely extending element adjacent each assembly and integrally connected to said members, the combination of spaced rotors on each assembly, a housing integral with each element adjacent each rotor, a gusset at one side of each housing comprising an upright portion connected to the housing and adjacent element for resisting torque loads on the housing, each gusset having another portion integral with the first-mentioned portion, the adjacent element, and side member and effective to resist lateral loads on the associated housing, actuating means mounted in each housing and removable through the top thereof, and means carried by each housing for engagement with the adjacent rotor, each of said means including levers operatively associated with the adjacent actuating means and rotor and pivoted to the associated housing.

2. In a brake arrangement for a railway car truck comprising a wheel and axle assembly and a truck frame supported from said assembly and including side rails and a transversely extending member merging at opposite ends with said rails, the combination of brake rotors connected to said assembly, spaced housings integral with said member and disposed adjacent respective rotors, braking means in each housing comprising brake levers carrying friction means receiving the adjacent rotor therebetween, means pivotally mounting said levers within said housing and movable therewith within said housing transversely thereof, resilient means compressed between said last-mentioned means and said housing for yieldably restraining said movement, and actuating means for said levers.

3. In a brake arrangement for a railway car truck comprising a wheel and axle assembly and a truck frame supported from said assembly including spaced side rails and a transom extending between said rails adjacent said assembly, the combination of a brake disc connected to said assembly, a pocket in said transom adjacent said disc, braking means in said pocket comprising brake levers carrying friction means receiving said disc therebetween, means pivotally mounting said levers and movably mounted in said pocket for movement transversely of said truck, resilient means under compression yieldably restraining said movement, and actuating means for said levers.

4. In a brake arrangement for a railway car truck comprising a wheel and axle assembly and a truck frame supported therefrom and including side rails and a transom between said rails adjacent said assembly, said transom having end portions coplanar with said side rails and an intermediate portion disposed below the level of said end portions, spaced housings integral with each end portion and the adjacent end of said intermediate portion, a wall extending from one side of each housing transversely of and connected to the adjacent end portion, a gusset between each wall and the adjacent side rail integral therewith and with the adjacent end portion, and means carried by each housing for decelerating said assembly.

5. In a brake arrangement for a railway car truck comprising a wheel and axle assembly and a truck frame supported therefrom and including a side rail and a transom adjacent said assembly, a housing integral with said transom and comprising a wall connected to said transom and said side rail, said wall having a portion extending transversely of said transom and another portion extending longitudinally of said transom between said first-named portion and said side rail, and means carried by said housing for decelerating said assembly.

6. In a brake arrangement for a railway truck comprising a wheel and axle assembly and a truck frame including a side rail and a substantially horizontal transom adjacent said assembly, an integral housing on said transom comprising top and bottom and spaced side walls extending laterally of said transom, said side walls being tapered at their lower edges adjacent said transom and merging therewith along the full depth thereof, said top wall merging with the upper portion of said transom and said bottom wall being inclined adjacent said transom and merging with portions thereof below said upper portion, a gusset formed as a continuation of the upper end of one of said side walls merging with said transom and having a portion extending laterally of said housing along said transom and merging with said side rail, and means carried by said housing for decelerating said assembly.

7. A truck frame structure comprising a side rail and a transom, an integral housing on one side of said transom and extending therebelow and adapted for carrying associated brake means, and a gusset connected to one side of said housing, to said transom and said rail, said gusset having a generally vertical portion extending above said housing and connected to said transom and effective to carry a torque load imposed on said housing, and another portion extending from the top edge of said first-named portion laterally of said housing and merging with said transom and said side rail and effective to carry lateral loads imposed against the housing.

8. In a brake arrangement for a vehicle comprising a frame supported from a wheel and axle assembly, a braking surface rotatable with said assembly, braking means supported by said frame and including brake levers carrying friction means for engagement with said surface for decelerating rotation of said assembly, pivot means slidably mounted on said frame and pivotally mounting said levers and movable therewith transversely of said vehicle, and yielding means for restraining said movement of said last-mentioned means.

9. In a brake arrangement for a railway car truck comprising a wheel and axle assembly and a truck frame supported therefrom and including a side rail and a transom, the combination of a housing integral with the transom, a gusset at one side of said housing connected thereto and to said transom and effective to resist torque loads imposed on said housing, said gusset including an integral portion connected to said transom and said rail and effective to resist lateral loads imposed on said housing, a cylinder unit removably mounted in said housing at one side of said gusset and removable through the top of said housing, and means carried by the housing for decelerating said assembly and operatively associated with said unit for actuation thereby.

10. In a brake arrangement for a railway car truck having a wheel and axle assembly and sprung and unsprung members supported therefrom, pivot means slidably supported by one of said members for movement transversely of said truck, and a brake lever mounted on said pivot means and supporting a brake element for engagement with a braking surface on said assembly, and means yieldably restraining said movement of said pivot means.

11. In a brake arrangement for a railway car truck comprising a wheel and axle assembly and a truck frame supported therefrom and including spaced side rails and a transversely extending member affording support for an associated bolster, the combination of a brake rotor connected to said assembly, a housing integral with said member, braking means directly connected to and solely carried by said housing for decelerating said rotor, and a web integrally formed with each housing, the adjacent side rail and said member for transmitting to said frame with said housings torque forces exerted by said braking means against said housings.

12. In a brake arrangement for a railway car truck comprising a wheel and axle assembly and a truck frame supported therefrom and including spaced side members and a transversely extending element adjacent said assembly and integral with said members, the combination of a brake rotor connected to said assembly, a housing integral with said element adjacent said rotor, said housing comprising top and bottom walls and spaced side walls integrally connected with said top and bottom walls, said top wall and side walls merging at their rear extremities with said element, a pair of brake levers directly pivoted to said top and bottom walls and carrying brake means receiving said rotor therebetween, and actuating means for said levers in said housing adjacent said element.

13. In a brake arrangement for a railway car truck comprising a wheel and axle assembly and a truck frame supported from said assembly and including side members and a transversely extending element integral with said members and disposed adjacent said assembly, the combination of a brake rotor connected to said assembly, a housing integral with said member adjacent said rotor and comprising integral spaced side walls and top and bottom walls, said side and top walls merging with said element, braking means in said housing and comprising a pair of brake levers carrying friction means receiving said rotor therebetween and adapted for braking engagement therewith, means pivotally mounting said levers within said housing and slidably interlocked with said top and bottom walls and movable with said levers longitudinally of said element, yieldable means compressed between said last-mentioned means and certain of said walls for resisting said movement, and actuating means for said levers.

14. In a brake arrangement for a railway car truck comprising a wheel and axle assembly and a truck frame supported from said assembly, the combination of at least one brake rotor connected to said assembly, a housing integral with said frame adjacent said rotor and comprising spaced walls, braking means in each housing comprising brake levers carrying friction means receiving said rotor therebetween, means pivotally mounting said levers in said housing and slidably engaging said spaced walls of said housing for movement in a horizontal plane relative to said housing, resilient means compressed between said last-mentioned means and said walls for yieldably resisting said movement and for restoring said last-mentioned means to normal position, and actuating means for said levers.

15. In a brake arrangement for a railway car truck comprising a wheel and axle assembly and a truck frame supported from said assembly, the combination of a braking surface on said assembly, a housing integral with said frame adjacent said surface and comprising spaced top and bottom walls, braking means supported in said housing and comprising brake levers carrying brake shoes for engagement with said surface, means pivotally mounting said levers in said housing and comprising spaced members disposed respectively above and below said levers and slidably interlocked with the adjacent wall of said housing, pivot means extending through said members and levers for interconnecting the same, a lug on each wall received within an intermediate recess in the associated member, resilient means in each recess at opposite sides of each lug compressed between the same and the associated member for yieldingly resisting movement of the same with said levers transversely of said housing, and actuating means for said levers.

16. In a brake arrangement for a railway car truck comprising a truck frame and a supporting wheel and axle assembly, the combination of a pair of spaced blocks slidably interlocked with said frame, pin openings through said blocks, levers between said blocks, pins extending through said levers and said openings to fulcrum said levers, abutment surfaces on said frame covering said openings to prevent disassembly of said pins, and engageable friction means on said levers and assembly.

WESLEY A. HELSTEN.

REFERENCES CITED

The following references are of record in the file of this patent:

UNITED STATES PATENTS

| Number | Name | Date |
| --- | --- | --- |
| 2,343,342 | Tack | Mar. 7, 1944 |
| 2,355,122 | Tack | Aug. 8, 1944 |
| 2,365,460 | Eksergian et al. | Dec. 19, 1944 |